(12) United States Patent
Huang et al.

(10) Patent No.: US 7,255,317 B2
(45) Date of Patent: Aug. 14, 2007

(54) ADJUSTABLE SUPPORT STRUCTURE FOR A PANEL COMPUTER

(75) Inventors: Chao-Ming Huang, Taipei (TW); Wen-Chieh Wang, Taipei (TW)

(73) Assignee: Tatung Co., Ltd. (TW)

( * ) Notice: Subject to any disclaimer, the term of this patent is extended or adjusted under 35 U.S.C. 154(b) by 303 days.

(21) Appl. No.: 10/987,149

(22) Filed: Nov. 15, 2004

(65) Prior Publication Data

US 2006/0043253 A1 Mar. 2, 2006

(30) Foreign Application Priority Data

Aug. 31, 2004 (TW) .............................. 93213797 U

(51) Int. Cl.
*F16M 11/00* (2006.01)
(52) U.S. Cl. ................. 248/371; 248/125.7; 248/286.1
(58) Field of Classification Search ............. 248/125.7, 248/370, 222.52, 282.1, 287.1, 286.1, 371, 248/397, 919–924
See application file for complete search history.

(56) References Cited

U.S. PATENT DOCUMENTS

| 7,061,753 | B2* | 6/2006 | Michoux et al. ............ 361/681 |
| 7,068,497 | B2* | 6/2006 | Chu ........................... 361/681 |
| 7,079,384 | B2* | 7/2006 | Wang et al. ................ 361/686 |
| 7,104,516 | B2* | 9/2006 | Uto et al. ................... 248/388 |
| 7,126,815 | B2* | 10/2006 | Hwang et al. .............. 361/681 |

* cited by examiner

*Primary Examiner*—Anita King
*Assistant Examiner*—Steven Marsh
(74) *Attorney, Agent, or Firm*—Bacon & Thomas, PLLC

(57) ABSTRACT

An adjustable support structure for a panel computer includes: a cradle having a slide slot at a middle section, at least two fastening slots placed at a bottom surface of the slide slot, and at least two pairs of positioning holes separately corresponding to the fastening slots are placed on two side walls of the slide slot. The back end of the support prop is optionally pushed against one of the fastening slots in the cradle; therefore, the cradle, the back support and the support prop which form a triangularly linked structure. The elastic unit can be pressed to drive the two positioning tabs to leave the positioning holes, so that the support prop can slide along the parallel track until the back support is at a desired leaning angle.

6 Claims, 4 Drawing Sheets

ADJUSTABLE SUPPORT STRUCTURE FOR A PANEL COMPUTER

BACKGROUND OF THE INVENTION

1. Field of the Invention

The present invention relates to an adjustable support structure, and more particularly, to an adjustable support structure for a panel computer.

2. Description of the Related Art

Currently, desktop computers and notebook computers have been gradually replaced by panel computers, as panel computers are easier to carry, are touch-controlled and utilize digital ink.

Generally, user simply holds the panel computer when using it. However, the user is usually sitting down when using the panel computer, and if the panel computer has no support element for itself, it can only be placed upon a table, which limits the viewing angle for the user.

A prior art support for the panel computer comprises a cradle, a shelf, and a supporting arm, which are all pivoted with respect to each other to hold the panel computer at a particular angle. However, this prior art support has the problem that when the user wants to pack the support, the cradle, the shelf, and the supporting arm cannot be packed in a stable configuration, which is inconvenient for portability. Furthermore, the prior art does not provide different viewing angles for the panel computer, and so the user may be unable to find a satisfactory viewing angle.

Therefore, it is desirable to provide an adjustable support structure for a panel computer to mitigate and/or obviate the aforementioned problems.

SUMMARY OF THE INVENTION

A main objective of the present invention is to provide an adjustable support structure for a panel computer that provides different viewing angles for the panel computer.

Another objective of the present invention is to provide an adjustable support structure for a panel computer that is more convenient for packing and carrying.

In order to achieve the above-mentioned objectives, an adjustable support structure for a panel computer comprises: a cradle, a back support, and a support prop. The cradle has a pivot portion at a front section of its top surface and a slide slot along a middle section, at least two fastening slots placed at a bottom surface of the slide slot, and at least two pairs of positioning holes separately corresponding to the fastening slots are placed on two side walls of the slide slot; a back support comprises a binding portion at a bottom end, a panel support at a front side and two pivot holes joined with the pivot portion of the cradle; and a support prop having a rotating shaft at a front end, a positioning tab at two sides of a back end, and an elastic unit at a middle section, wherein the rotating shaft pivoted in the pivot holes of the back support, each positioning tab connected to the elastic unit, the elastic unit providing a predetermined flexible force to force the two positioning tabs to protrude out of the support prop, the elastic unit capable of being pressed to force the two positioning tabs to engage with the supporting shelf. The present invention is characterized in that the back end of the supporting shelf is capable of being pushed against one of the fastening slots of the slide slot, and the two positioning tabs are capable of being inserted into one pair of the positioning holes.

Furthermore, two parallel tracks placed at a bottom surface of the slide slot, and those two tracks separately corresponding to the slide slot. Each back end of the two parallel tracks further has an opening, and the two positioning tabs can be detached from the cradle through the two opening. Moreover, the back support further comprises a containment space, and the support prop can be disposed in the containment space.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
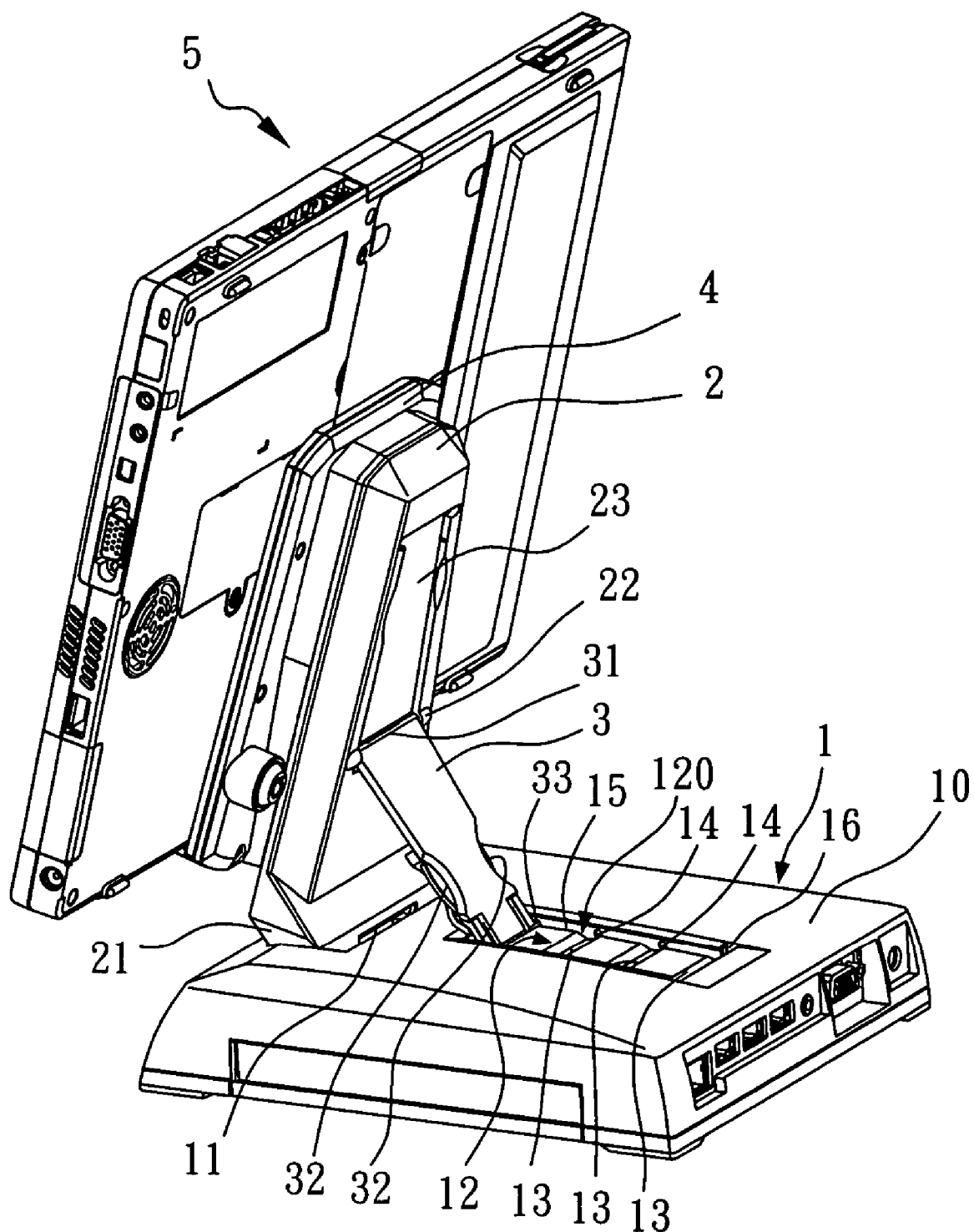
FIG. 1 is a perspective drawing of an embodiment according to the present invention.

Please refer to FIG. 1. An embodiment of the present invention comprises a cradle 1, a back support 2, and a support prop 3 which form a triangularly linked structure to provide different viewing angles for the back support 2. The back support 2 further comprises a panel support 4 to hold a panel computer 5.

The cradle 1 has a pivot portion 11 at a front section of its top surface 10, and a slide slot 12 along a middle section. As shown in FIG. 1, there are a plurality of parallel fastening slots 13 placed along the bottom surface of the slide slot 12, and a plurality of pairs of positioning holes 14 separately corresponding to the fastening slots 13 are disposed on two side walls 120 of the slide slot 12; each pair of positioning holes 14 correspond to one fastening slot 13. The two side-wall 120 of the slide slot 12 further comprise a pair of parallel tracks 15, and an opening 16 is placed at the back end of the parallel track 15. The number of fastening slots 13 can be determined by need, the viewing angle range, and the length of the slide slot 12; two, three or more fastening slots 13 may be provided.

The back support 2 comprises a binding portion 21 at its bottom end, a panel support 4 for holding the panel computer 5, and a containment space 23 having two internally disposed pivot holes 22. The binding portion 21 is pivoted at the pivot portion 11 of the cradle 1 and used to adjust the intersection angle between the back support 2 and the cradle 1.

The support prop 3 has a rotating shaft 31 at its front end, a positioning tabs 32 placed on both sides of the back end of the support prop, and an elastic unit 33 at the end of the support prop 3. The positioning tabs 32 are connected to the elastic unit 33 so that a predetermined flexible force provided by the elastic unit 33 forces the two positioning tabs 32 to protrude out of the support prop 3, and the elastic unit 33 is capable of being pressed to force the two positioning tabs to click into the support prop 3. As shown in FIG. 1, the rotating shaft 31 is pivoted at the pivot holes 22 of the back support 2, so the support prop 3 can rotate around the rotating shaft 31 to adjust the intersection angle between the support prop 3 and the back support 2. The back end of the support prop 3 may optionally be pushed against one of the fastening slots 13 of the slide slot 12, and the two positioning tabs 32 insert into one pair of the positioning holes 14.

The binding portion 21 of the back support 2 is pivoted at the pivot portion 11 of the cradle 1, the rotating shaft 31 is pivoted at the pivot holes 22 of the back support 2, and the back end of the support prop 3 is optionally pushed against one of the fastening slots 13 in the cradle 1; therefore, the cradle 1, the back support 2 and the support prop 3 form a triangularly linked structure. When a user wants to change the viewing angle of the back support 2, he or she applies a force larger than the predetermined flexible force to the elastic unit 33 so that the elastic unit 33 drives the two positioning tabs 32 to leave the positioning holes 14, so that the support prop 3 can slide along the parallel track 15 until the back support 2 is at a desired leaning angle, and then the elastic unit 33 is released for insertion into another set of positioning holes 14 in the sliding slot 12, and back end of the support prop 3 is optionally pushed against the corresponding fastening slot 13 for stability.

Figure 2:
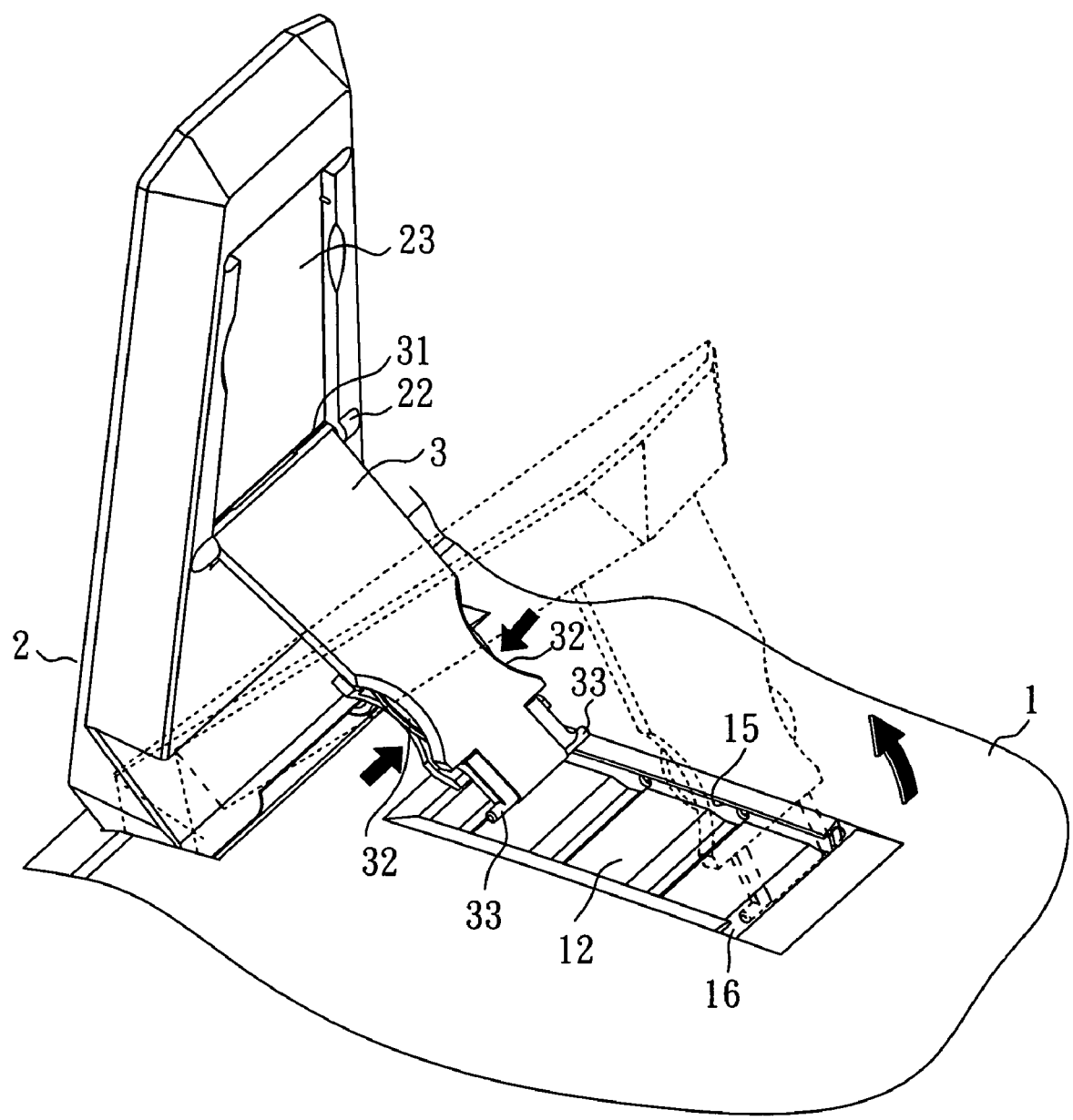
FIG. 2 is a detailed view of the embodiment according to the present invention.
Figure 3:
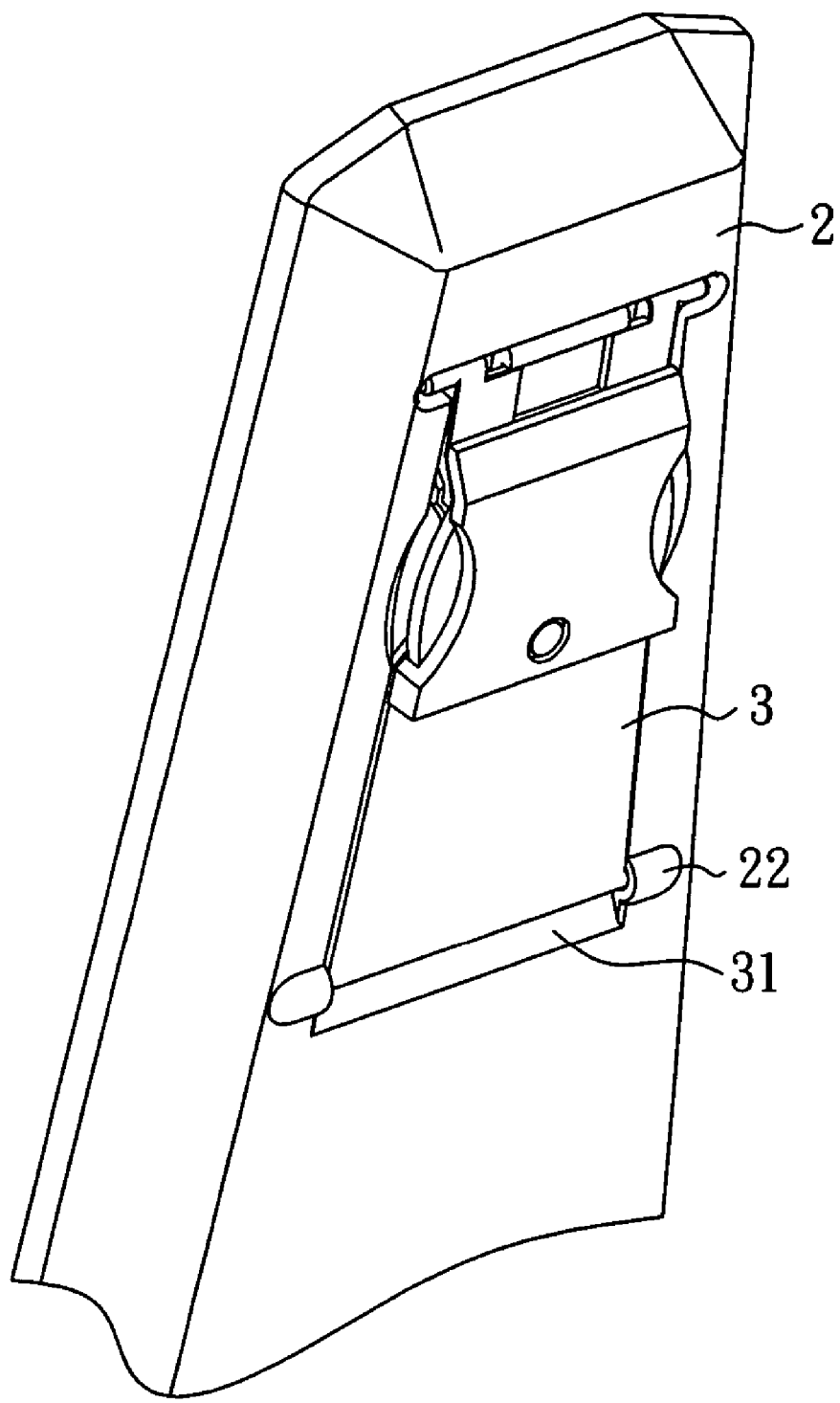
FIG. 3 is a schematic drawing depicting a support shelf packed in a containment space.
Figure 4:
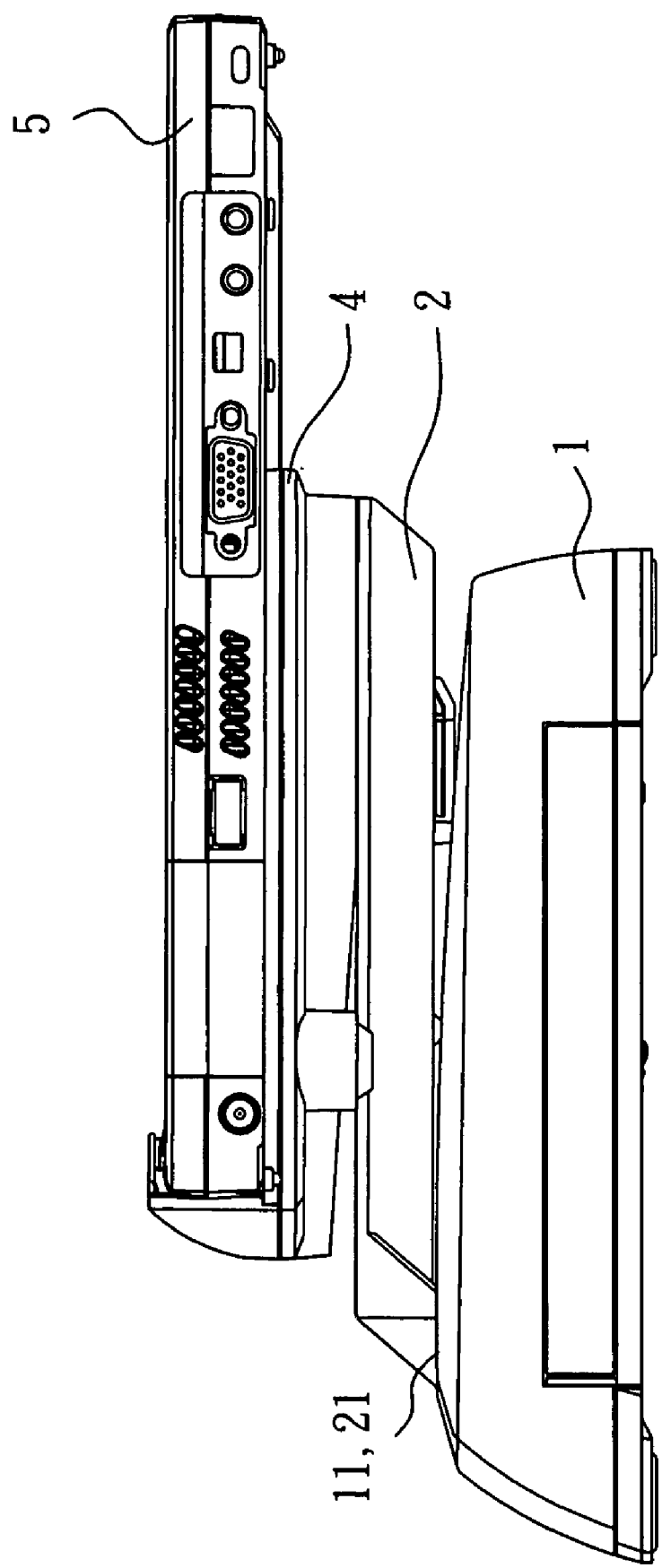
FIG. 4 is a schematic drawing of folding the embodiment according to the present invention.

Please refer to FIG. 2. FIG. 2 is a detailed view of the embodiment according to the present invention. In order to close the cradle 1, the back support 2 and the support prop 3, the positioning tabs 32 can been risen through the opening 16 of the parallel tracks 15, so the rotating shaft 31 of the support prop 3 pivots in the pivot holes 22 of the back support 2 and back end of the supporting prop depart from the cradle. Please refer to FIG. 3. Therefore, the containment space 23 of the back support 2 can be used to contain the support prop 3. Please refer to FIG. 4, the binding portion 21 of the back support 2 can be rotated downward at the pivot portion 11 of the cradle 1, and the back support 2 and the cradle 1 can be clipped together to reduce space.

According to the above description, the adjustable support structure of the present invention can provide different viewing angles for the panel computer to satisfy different desires of the user. The present invention can also be folded into a smaller size, which is more convenient for packing and carrying.

Although the present invention has been explained in relation to its preferred embodiment, it is to be understood that many other possible modifications and variations can be made without departing from the spirit and scope of the invention as hereinafter claimed.

What is claimed is:

1. An adjustable support structure for a panel computer comprising:
    a cradle having a pivot portion at a front section of its surface and a slide slot at a middle section, at least two fastening slots placed at a bottom surface of the slide slot, and at least two pairs of positioning holes separately corresponding to the fastening slots are placed on two side walls of the slide slot;
    a back support comprising a binding portion at a bottom end pivoted to the pivot portion of the cradle, a panel support at a front side and two pivot holes disposed at a back side; and
    a support prop having a rotating shaft at a front end, a positioning tab at two sides of a back end, and an elastic unit at a middle section, the rotating shaft pivoted in the pivot holes of the back support, each positioning tab connected to the elastic unit, the elastic unit providing a predetermined flexible force to force the two positioning tabs to protrude out of the support prop, the elastic unit capable of being pressed to force the two positioning tabs to engage with the support prop;
    wherein, the back end of the support prop is capable of being pushed against one of the fastening slots of the slide slot, and the two positioning tabs are capable of being inserted into one pair of the positioning holes.

2. The adjustable support structure as claimed in claim 1, wherein each side wall of the slide slot further comprises a parallel track respectively.

3. The adjustable support structure as claimed in claim 2, wherein each back end of the two parallel tracks further has an opening, and the two positioning tabs can be detached from the cradle through the two opening.

4. The adjustable support structure as claimed in claim 1, wherein the back of the back support further comprises a containment space, and the support prop can be disposed in the containment space.

5. The adjustable support structure as claimed in claim 4, wherein the two pivot holes are disposed in the containment space.

6. The adjustable support structure as claimed in claim 1, wherein the panel supporter of the back support is capable of holding a panel computer.

* * * * *